United States Patent
Chiu

(10) Patent No.: US 9,344,137 B1
(45) Date of Patent: May 17, 2016

(54) PROTECTION DEVICE AND PROTECTION METHOD

(71) Applicant: Chiun Mai Communication Systems, Inc., New Taipei (TW)

(72) Inventor: Yi-Chieh Chiu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/585,511

(22) Filed: Dec. 30, 2014

(30) Foreign Application Priority Data

Nov. 20, 2014 (CN) .......................... 2014 1 0670068

(51) Int. Cl.
*H04B 1/3888* (2015.01)
*H04B 1/38* (2015.01)
*H04M 1/02* (2006.01)

(52) U.S. Cl.
CPC ...... *H04B 1/3888* (2013.01); *H04B 2001/3894* (2013.01); *H04M 1/026* (2013.01)

(58) Field of Classification Search
None
See application file for complete search history.

(56) References Cited

U.S. PATENT DOCUMENTS

| 4,281,427 A * | 8/1981 | Petters ............... H01Q 1/1292 |
| | | 116/210 |
| 9,154,593 B1 * | 10/2015 | Meldner ............... H04M 1/026 |
| 2003/0045189 A1 * | 3/2003 | Cole, Jr. .................. B63C 7/10 |
| | | 441/133 |
| 2014/0273678 A1 * | 9/2014 | Meyer .................... B63B 22/22 |
| | | 441/31 |

* cited by examiner

*Primary Examiner* — Daniel Lai
(74) *Attorney, Agent, or Firm* — Novak Druce Connolly Bove + Quigg LLP

(57) ABSTRACT

Method of protecting a device using a protection device is provided. The protection device includes a water pressure sensor, a visibility sensor, an airbag, and a protection unit that is in communication with the water pressure sensor, the visibility sensor, and the airbag through a data bus. The protection unit obtains a water pressure value from the water pressure sensor, and activates the visibility sensor when the water pressure value is greater than a first predetermined value. The protection unit further obtains a visibility value from the visibility sensor, and inflates the airbag when the visibility value is less than a second predetermined value for a predetermined duration.

6 Claims, 2 Drawing Sheets

PROTECTION DEVICE AND PROTECTION METHOD

CROSS-REFERENCE TO RELATED APPLICATIONS

This application claims priority to Chinese Patent Application No. 201410670068.0 filed on Nov. 20, 2014, the contents of which are incorporated by reference herein.

FIELD

The subject matter herein generally relates to controlling technology, and particularly to a protection device and a method for protecting a device to avoid dropping into water.

BACKGROUND

Generally, a personal device such as a key or a mobile phone may fall into water. It is hard to find the personal device if the water is deep and the personal device may be damaged.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
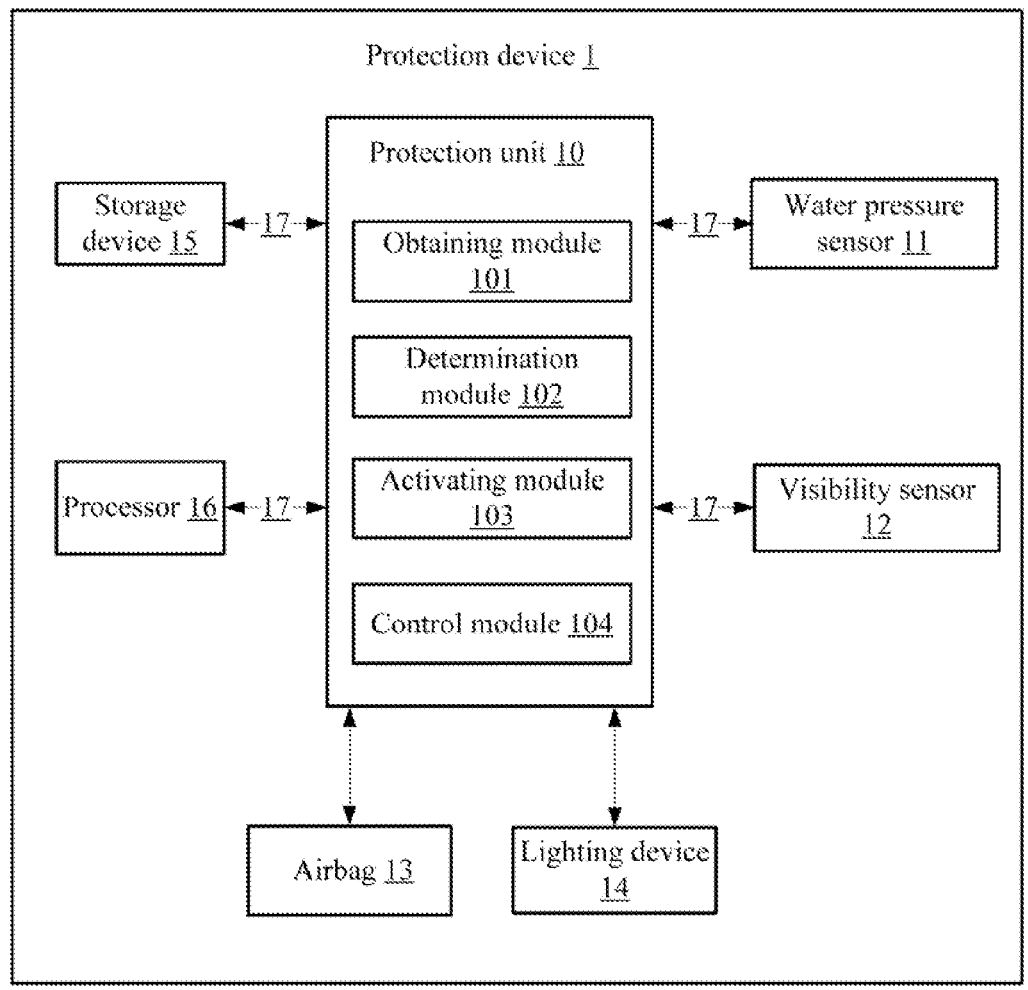
FIG. 1 is a block diagram of one embodiment of a protection device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of a protection device. Depending on the embodiment, a protection device 1 includes a protection unit 10, a water pressure sensor 11, a visibility sensor 12, an airbag 13, a lighting device 14, a storage device 15, and at least one processor 16. The protection unit 10 is in communication with the water pressure sensor 11, the visibility sensor 12, the airbag 13, the lighting device 14, the storage device 15, and the at least one processor 16 through a data bus 17. FIG. 1 illustrates only one example of the protection device 1 that may include more or fewer components than illustrated, or have a different configuration of the various components in other embodiments.

In one embodiment, the water pressure sensor 11 is used to detect a water pressure value. The visibility sensor 12 is used to detect a visibility value. In one embodiment, the protection unit 10 determines whether the protection device 1 is needed to activate a protection function according to the water pressure value and the visibility value. When the protection device 1 is determined to be needed to activate the protection function, the protection unit 10 actives the protection function of the protection device 1 by inflating the airbag 13.

In one embodiment, the protection unit 10 further activates the lighting device 14, to facilitate a user to find the protection device 1, when the protection device 1 is determined to be needed to active the protection function.

In one embodiment, when the user uses the protection device 1 to prevent a device such as a mobile phone or a car key from falling into water, the device can be tied to the protection device 1 using a rope.

The storage device 15 can be an internal storage device, such as a flash memory, a random access memory (RAM) for temporary storage of information, and/or a read-only memory (ROM) for permanent storage of information. The storage device 15 can also be an external storage device, such as an external hard disk, a storage card, or a data storage medium. The at least one processor 16 can be a central processing unit (CPU), a microprocessor, or other data processor chip that performs functions of the protection device 1.

In at least one embodiment, the protection unit 10 may include an obtaining module 101, a determination module 102, an activating module 103, and a control module 104. The function modules 101-104 may include computerized codes in the form of one or more programs, which are stored in the storage device 15, and are executed by the at least one processor 16 to provide functions of the present disclosure. Details will be given in the following paragraphs.

The obtaining module 101 obtains the water pressure value from the water pressure sensor 11.

The determination module 102 determines whether the water pressure value is greater than a first predetermined value. In one embodiment, the determination module 102 provides a user interface for the user to set the first predetermined value.

The activating module 103 activates the visibility sensor 12 when the water pressure value is greater than the first predetermined value. The obtaining module 101 obtains the visibility value from the visibility sensor 12. Because the visibility sensor 12 is not activated until the water pressure value is determined to be greater than the first predetermined value, power of the protection device 1 can be saved.

The determination module 102 determines whether the visibility value is less than a second predetermined value. In one embodiment, the user interface provided by the determination module 102 can be used to set the second predetermined value. For example, the user can set the second predetermined value according to a clarity of water.

The determination module 102 further determines whether the visibility value is continued to be less than the second predetermined value for a predetermined duration (e.g., 1 minute). In other words, if no visibility value is greater than or equal to the second predetermined value within the predetermined duration, the determination module 102 determines that the visibility value is continued to be less than the second predetermined value for the predetermined duration. In one embodiment, the determination module 102 determines that the protection device 1 is needed to activate the protection function when the visibility value is continued to be less than the second predetermined value for the predetermined duration. The determination module 102 determines that the protection device 1 has no need to activate the protection function when any visibility value is greater than or equal to the second predetermined value within the predetermined duration.

The control module 104 activates the protection function of the protection device 1 by inflating the airbag 13, when the visibility value is continued to be less than the second predetermined value for the predetermined duration. The inflated airbag 13 can enable the protection device 1 to float out of the water. In one embodiment, the activating module 102 further activates the lighting device 14 to indicate a current position of the device protected by the protection device 1, when the visibility value is continued to be less than the second predetermined value for the predetermined duration. Thus, it is easily for the user to find the device using the protection device 1.

Figure 2:
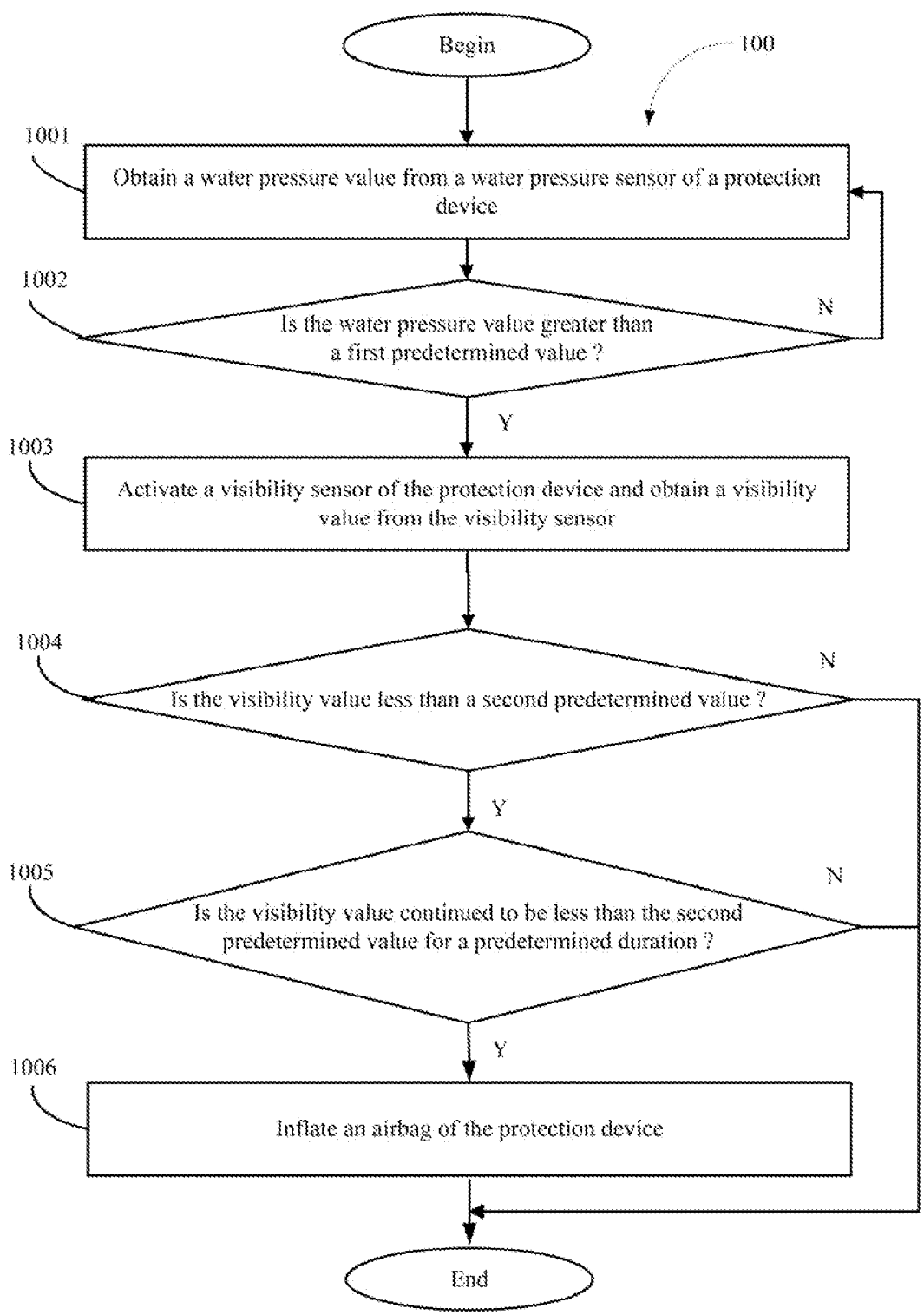
FIG. 2 illustrates a flowchart of one embodiment of a method for activating a protection function of the protection device.

FIG. 2 illustrates a flowchart is presented in accordance with an example embodiment. The example method 100 is provided by way of example, as there are a variety of ways to carry out the method. The method 100 described below can be carried out using the configurations illustrated in FIG. 1, for example, and various elements of these figures are referenced in explaining example method 100. Each block shown in FIG. 2 represents one or more processes, methods or subroutines, carried out in the exemplary method 100. Furthermore, the illustrated order of blocks is by example only and the order of the blocks can be changed according to the present disclosure. The exemplary method 100 can begin at block 1001. Depending on the embodiment, additional steps can be added, others removed, and the ordering of the steps can be changed.

At block 1001, an obtaining module obtains a water pressure value from a water pressure sensor of a protection device.

At block 1002, a determination module determines whether the water pressure value is greater than a first predetermined value. If the water pressure value is greater than the first predetermined value, the process goes to block 1003. If the water pressure value is not greater than the first predetermined value, the process goes back to block 1001. In one embodiment, the determination module provides a user interface for a user to set the first predetermined value.

At block 1003, an activating module activates a visibility sensor of the protection device, when the water pressure value is greater than the first predetermined value. The obtaining module obtains a visibility value from the visibility sensor. Because the visibility sensor is not activated until the water pressure value is determined to be greater than the first predetermined value, power of the protection device can be saved.

At block 1004, the determination module determines whether the visibility value is less than a second predetermined value. If the visibility value is less than the second predetermined value, the process goes to block 1005. If the visibility value is not less than the second predetermined value, the process is end. In one embodiment, the user interface provided by the determination module 102 can be used to set the second predetermined value. For example, the user can set the second predetermined value according to clarity of water.

At block 1005, the determination module further determines whether the visibility value is continued to be less than the second predetermined value for a predetermined duration (e.g., 1 minute). In other words, if no visibility value is greater than or equal to the second predetermined value within the predetermined duration, the determination module determines that the visibility value is continued to be less than the second predetermined value for the predetermined duration. If the visibility value is continued to be less than the second predetermined value for the predetermined duration, the process goes to bock 1006. If the visibility value is not continued to be less than the second predetermined value for the predetermined duration, the process is end.

In one embodiment, the determination module determines that the protection device is needed to activate a protection function when the visibility value is continued to be less than the second predetermined value for the predetermined duration, the process goes to block 1006. The determination module determines that the protection device has no need to activate the protection function when any visibility value is greater than or equal to the second predetermined value within the predetermined duration, then the process is end.

At block 1006, a control module activates the protection function of the protection device by inflating an airbag of the protection device 1, when the visibility value is continued to be less than the second predetermined value for the predetermined duration. The inflated airbag can enable the protection device to float out of the water. In one embodiment, the activating module further activates a lighting device of the protection device to indicate a current position of the device protected by the protection device, when the visibility value is continued to be less than the second predetermined value for the predetermined duration. Thus, it is easily for the user to find the device using the protection device back.

It should be emphasized that the above-described embodiments of the present disclosure, including any particular embodiments, are merely possible examples of implementations, set forth for just a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A protection device comprising:
a water pressure sensor;
a visibility sensor;
an airbag;
a protection unit that is in communication with the water pressure sensor, the visibility sensor, and the airbag through a data bus;
at least one processor; and
a storage device storing a plurality of instructions, which when executed by the processor, cause the processor to:
obtain a water pressure value from the water pressure sensor via the protection unit;
activate, via the protection unit, the visibility sensor when the water pressure value is greater than a first predetermined value;

obtain a visibility value from the visibility sensor via the protection unit; and inflate, via the protection unit, the airbag if the visibility value is less than a second predetermined value for a predetermined duration.

2. The protection device according to claim 1, wherein the processor further:

activates, via the protection unit, a lighting device when the visibility value is continued to be less than the second predetermined value for the predetermined duration.

3. A computer-implemented method for protecting a device using a protection device, the protection device comprising a water pressure sensor, a visibility sensor, an airbag, and a protection unit that is in communication with the water pressure sensor, the visibility sensor, and the airbag through a data bus, the protection device further comprising at least one processor, the method comprising:

obtaining a water pressure value from the water pressure sensor via the protection unit;

activating, via the protection unit, the visibility sensor when the water pressure value is greater than a first predetermined value;

obtaining a visibility value from the visibility sensor via the protection unit; and inflating, via the protection unit, the airbag if the visibility value is less than a second predetermined value for a predetermined duration.

4. The computer-implemented method according to claim 3, wherein the method further comprises:

activating, via the protection unit, a lighting device when the visibility value is continued to be less than the second predetermined value for the predetermined duration.

5. A non-transitory storage medium having stored thereon instructions that, when executed by a processor of a protection device, causes the processor to perform a method of protecting a device using the protection device, the protection device comprising a water pressure sensor, a visibility sensor, an airbag, and a protection unit that is in communication with the water pressure sensor, the visibility sensor, and the airbag through a data bus, wherein the method comprises:

obtaining a water pressure value from the water pressure sensor via the protection unit;

activating, via the protection unit, the visibility sensor when the water pressure value is greater than a first predetermined value;

obtaining a visibility value from the visibility sensor via the protection unit; and inflating, via the protection unit, the airbag if the visibility value is less than a second predetermined value for a predetermined duration.

6. The non-transitory storage medium according to claim 5, further comprising:

activating, via the protection unit, a lighting device when the visibility value is less than the second predetermined value for the predetermined duration.

\* \* \* \* \*